United States Patent [19]
Chan

[11] Patent Number: 5,441,462
[45] Date of Patent: Aug. 15, 1995

[54] CLUTCH DISENGAGE LOGIC

[75] Inventor: Kwok W. Chan, Chorley, England

[73] Assignee: Eaton Corporation, Cleveland, Ohio

[21] Appl. No.: 242,826

[22] Filed: May 16, 1994

[30] Foreign Application Priority Data

Jun. 10, 1993 [GB] United Kingdom ................ 9312013

[51] Int. Cl.6 ................ B60K 41/22; B60K 41/28
[52] U.S. Cl. .......................... 477/74; 477/83; 477/78; 477/86
[58] Field of Search ............. 477/74, 78, 83, 86

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,595,986 | 6/1986 | Daubenspeck et al. | 364/424.1 |
| 4,646,891 | 3/1987 | Braun | 192/0.032 |
| 4,648,290 | 3/1987 | Dunkley et al. | 74/866 |
| 4,683,996 | 8/1987 | Hattori et al. | 477/74 |
| 4,850,236 | 7/1989 | Braun | 74/337 |
| 5,064,039 | 11/1991 | Otsuka et al. | 477/86 |

*Primary Examiner*—Dirk Wright
*Attorney, Agent, or Firm*—Howard D. Gordon

[57] ABSTRACT

A control system/method for controlling the engagement and disengagement of a friction master clutch (16) in an automated mechanical transmission system (10) is provided. The control system/method is effective to minimize shift transient times and to minimize or eliminate the occurrence of cab lurch events.

36 Claims, 3 Drawing Sheets

CLUTCH DISENGAGE LOGIC

BACKGROUND OF THE INVENTION

1. Field of the Invention

The present invention relates to a control system/method for controlling the disengagement of the friction master clutch in a vehicular automated mechanical transmission system and, in particular, to a control system/method for controlling disengagement of the master clutch at initiation of a shift from a currently engaged transmission ratio into a target transmission ratio or transmission neutral.

2. Description of the Prior Art

Vehicular fully or partially automated mechanical transmission systems are well known in the prior art. Examples of such transmission systems may be seen by reference to U.S. Pat. Nos. 4,361,060; 4,595,986; 4,648,290 and 4,850,236, the disclosures of which are incorporated herein by reference.

Briefly, vehicular automated transmission systems comprise a fuel controlled engine, a multiple speed mechanical transmission and a selectively engaged and disengaged master friction clutch drivingly interposed between the engine and transmission. For more rapid downshifts, a downshift or input shaft brake is usually provided and, for more efficient vehicle retardation, an engine exhaust brake may be provided. A control unit, typically a microprocessor based ECU, receives a plurality of input signals, processes the input signals according to predetermined logic rules and issues command output signals to various actuators such a fuel controller, a clutch operator, an input shaft brake operator and/or a transmission operator.

The prior art fully or partially automated mechanical transmission systems typically operate in a shift sequence wherein the master clutch is disengaged at initiation of shifting to assure disengagement of the positive jaw clutches associated with the currently engaged ratio. Disengagement of the master clutch, if premature or when the engine brake is applied, may result in an undesirable rapid yaw in the vehicle cab as torque in the drive line unwinds with disengagement of the master clutch. This reaction, commonly referred to as "cab lurch" or "cab dip" is particularly disagreeable if the master clutch is disengaged at relatively high fueling of the engine, relatively high torque in the driveline and/or when an engine brake is not fully disengaged.

SUMMARY OF THE INVENTION

In accordance with the present invention, the drawbacks of the prior art are minimized or overcome by the provision of an automated mechanical transmission system control for controlling master clutch disengagement at the start of a shifting operation to minimize or eliminate so-called "cab lurch" and to minimize the duration of shifting operations.

The above is accomplished by, at initiation of a shift, selecting or preselecting a gear neutral condition and monitoring selected system parameters, such as time since shift sequence was initiated, current engine fueling, transmission condition, clutch position and/or operation of an engine brake and, for downshifts, if gear neutral is sensed, quickly causes the clutch to remain engaged or to be reengaged and immediately commences modulating engine speed to cause synchronous conditions for engagement of a target gear ratio, and, if gear neutral is not sensed, delays disengagement of the master clutch at initiation of a shift sequence until certain preconditions, such as a predetermined decrease in engine fueling or expiration of a predetermined time occur. For upshifts, the master clutch is disengaged upon the first to occur of sensing gear neutral or occurrence of the preconditions and synchronizing by applying the input shaft brake begins immediately upon sensing gear neutral and master clutch disengagement.

Accordingly, it is an object of the present invention to provide an improved control method/system for controlling clutch disengagement in an at least partially automated vehicular mechanical transmission system.

A further object of the present invention is to provide an improved control system/method for controlling master clutch disengagement in a vehicular automated mechanical transmission system to minimize shift times and to reduce or eliminate "cab lurch", also called "cab dip", at initiation of a shift out of a currently engaged gear ratio into a selected target transmission ratio or neutral.

These and other objects and advantages of the present invention will become apparent from a reading of the description of the preferred embodiment taken with the attached drawings.

DESCRIPTION OF THE PREFERRED EMBODIMENT

Figure 1:
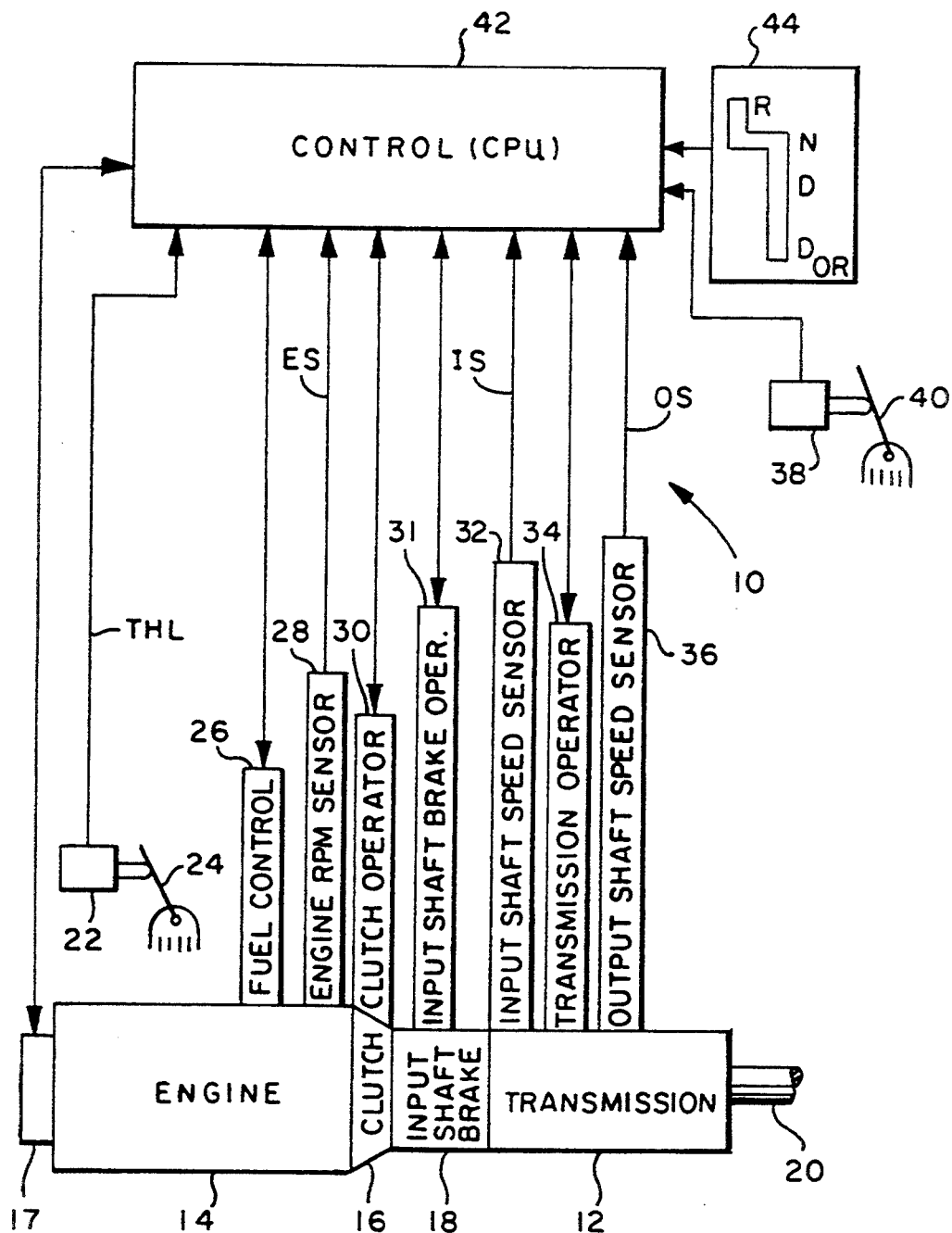
FIG. 1 is a schematic representation of a vehicular automated mechanical transmission system.

FIG. 1 schematically illustrates vehicular automatic mechanical transmission system 10 including an automatic multi-speed compound mechanical change gear transmission 12 driven by a fuel controlled engine 14, such as a well known diesel engine, through selectively engaged and disengaged friction master clutch 16. An engine brake such as an exhaust brake 17 for retarding vehicle speed by retarding the rotational speed of engine 14 and/or an input shaft brake 18 which is effective to apply a retarding force to the transmission input shaft upon disengagement of coupling 16 for more rapid upshifts may be provided as is known in the prior art. The output of automatic transmission 12 is output shaft 20 which is adapted for driving connection to an appropriate vehicle component such as the differential of a drive axle, a transfer case, or the like as is well known in the prior art.

The above-mentioned power train components are acted upon and monitored by several devices, each of which will be discussed below. These devices include a throttle pedal position monitor assembly 22 which senses the position (THL) of the operator controlled throttle device 24, a fuel control device 26 for controlling the amount of fuel to be supplied to engine 14, and engine speed sensor 28 which senses the rotational speed (ES) of the engine, a clutch operator 30 which engages and disengages coupling clutch 16 and which also supplies information as to the status of the clutch, an input brake operator 31, a transmission input shaft speed (IS) sensor 32, a transmission operator 34 which is effective to shift the transmission 12 into a selected gear ratio (GR) and to provide a signal indicative of the gear neutral (GN) condition and/or the currently engaged gear ratio ($GR_c$), and a transmission output shaft speed (OS) sensor 36. A vehicle brake monitor 38 senses actuation of the vehicle brake pedal 40.

Clutch operator 30 may be of any type, several examples of which are as shown in U.S. Pat. Nos. 4,081,065, 4,729,462 and 5,004,086, the disclosures of which are incorporated by reference. Shift actuators may be of the parallel piston type illustrated in U.S. Nos. 4,936,156; 4,928,544; 4,899,607 and 4,722,237, or of a differing type. The disclosures of these patents are all incorporated herein by reference.

The above-mentioned devices supply information to and/or accept commands from a central processing unit or control 42. The central processing unit 42 may include timers, clocks, counters and analog and/or digital electronic calculation and logic circuitry, the specific configuration and structure of which forms no part of the present invention. The central processing unit also receives information from a shift control assembly 44 by which the vehicle operator may select a reverse (R), neutral (N), on-highway forward drive (D) or off-road forward drive ($D_{OR}$) mode of operation of the vehicle. An electrical power source (not shown) and/or a source of pressurized fluid (not shown) provides electrical and/or pneumatic or hydraulic power to the various sensing, operating and/or processing units. Drivetrain components and controls therefor of the type described above are known in the prior art and may be appreciated in greater detail by reference to above-mentioned U.S. Pat. Nos. 4,595,986; 4,081,065; 4,361,060 and 4,648,290.

Sensors 22, 28, 32, 36, 38 and 40 may be of any known type or construction for generating analog or digital signals proportional to the parameter analog or digital signals proportional to the parameter monitored thereby. Similarly, operators 17, 18, 26, 30 and 34 may be of any known electric, hydraulic, pneumatic or electro-pneumatic type for executing operations in response to command signals from the central processing unit 42 and/or for providing input signals thereto. Fuel control 26 will normally supply fuel to engine 14 in accordance with the operator setting of throttle pedal 24 but may supply a lessor (fuel dipped) or greater (fuel boost) amount of fuel in accordance with commands from the central processing unit 42.

Clutch operator 30 is preferably controlled by the central processing unit 42 and may engage and/or disengage master clutch 16 as described in above-mentioned U.S. Pat. No. 4,081,065. Transmission 12 is a mechanical transmission using positive jaw clutches to engage and disengage selected ratios. Transmission 12 is preferably, but not necessarily, of the twin countershaft type as is seen in U.S. Pat. Nos. 3,105,395 and 4,648,290, the disclosures of which are incorporated by reference.

In addition to direct inputs, the central processing unit may be provided with circuitry for differentiating various input signals such as, for example, the input signal from sensor 28 to provide a calculated signal indicative of the rate of acceleration of the engine.

In the automatic mechanical transmission system illustrated in FIG. 1, a primary purpose of the central processing unit is to select, in accordance with predetermined logic rules and current or stored parameters, the optimum gear ratio at which the transmission should be operating and, if necessary, to command a gear change, or shift into the selected optimal gear ratio, or target gear ratio ($GR_T$), based upon the current and/or stored information.

Driver demands are communicated by means of selector assembly 44. The selector 44 has at least two selectable forward operating 45 modes including an over-the-highway mode (D) and an off-road ($D_{OR}$) mode either of which may be selected by the operator. In the off-road mode, performance is to maximize at the probable expense of fuel economy and/or vehicle comfort.

The following events are required for upshifting transmission 12, especially when automated transmission system 10 is equipped with an engine (exhaust) brake 17 and an upshift or input shaft brake 18. For an upshift from a currently engaged ratio into a target ratio; the transmission actuator 34 is biased or preselected to shift from the currently engaged ratio $GR_c$ into neutral GN, fueling of the engine is decreased at a predetermined rate to lower driveline torque, the clutch 16 is disengaged to allow the transmission shift into neutral to occur and to allow operation of the input shaft brake 18, the input shaft brake 18 is applied to cause synchronous conditions for engaging the target gear ratio, the target gear ratio is engaged and then the master clutch is reengaged.

For a downshift from a currently engaged ratio $GR_c$ into a target gear ratio $GR_T$ the transmission actuator is biased or preselected to shift from the currently engaged ratio into gear neutral GN, fueling of the engine is decreased to lower driveline torque, if necessary the master clutch 16 is disengaged to allow the transmission to shift into neutral, upon sensing a gear neutral condition, the master clutch is reengaged or maintained engaged and fueling of the engine is boosted to cause synchronous conditions for engagement of the target gear ratio, and then the target gear ratio is engaged (usually with the master clutch remaining in engagement).

The term "upshift" as used herein shall mean the shifting from a lower speed gear ratio to a higher speed gear ratio and the term "downshift" as used herein shall mean the shifting from a higher speed gear ratio to a lower speed gear ratio. The term "low speed gear" as used herein shall designate the gear ratios utilized for lowest forward speed operation in a transmission, i.e., that set of gears having a highest ratio of reduction of input shaft speed relative to the input shaft of the transmission.

Synchronous conditions exist for engaging the target gear ratio when the input shaft speed (IS) equals or substantially equals the product of the output shaft speed (OS) times the target gear ratio ($GR_T$) or $IS = OS \times GR_T$. When the master clutch is fully engaged, engine speed equals input shaft speed, and at synchronous conditions $ES = IS = OS \times GR_T$.

During the shift from the currently engaged gear ratio $GR_c$ into neutral GN, the transmission jaw clutch engaging the currently engaged gear ratio is biased or preloaded by the shifting mechanism 34 to disengage. The preload force is usually less than the friction forces developed by the driveline torque resisting disengagement and, due to the "torque lock", the jaw clutch will remain engaged. If the master clutch 16 is prematurely disengaged when a high level of torque is being transmitted therethrough, the entire driveline will unwind quickly causing a very objectionable cab lurch. Also, if the master clutch is disengaged while the transmission is in gear and the engine brake is still retarding the vehicle, i.e. has not fully disengaged, a very objectionable cab lurch is likely to occur.

While it is important to prevent premature disengagement of the master clutch, it is equally important to avoid unnecessary delays in the shift sequence for acceptable performance of system 10. Accordingly, during a downshift, if a shift into neutral (GN) is sensed prior to full disengagement of the master clutch, the clutch 16 is not disengaged, or is rapidly reengaged, and synchronizing action immediately commenced and, if neutral is not sensed, the clutch is disengaged as soon as possible consistent with minimizing a cab lurch. Preferably, during an upshift, the master clutch is immediately disengaged upon sensing gear neutral (GN to allow rapid application of the input shaft brake for synchronizing purposes.

Further, to minimize a duration of shift operations, assuming system 10 has means for clutch position sensing, the clutch is disengaged to just the "touch point" or "point of incipient engagement" (see U.S. Pat. No. 4,646,891, the disclosure of which is incorporated herein by reference) rather than to a fully-disengaged position. Alternatively, the clutch may be fully disengaged and then quickly returned to about the touch point (LP).

To minimize or eliminate cab lurch, while minimizing the time duration of shifting operations, the control system/method of the present invention is utilized. The control system/method of the present invention is schematically illustrated, in flow chart format, in FIGS. 2A, 2B and 2C.

The control of the present invention will determine if a predetermined period of time has elapsed since the request from operator to shift from the currently engaged ratio. A delay timer, or delay counter, may be used. This delay will only be applied if engine exhaust brake is engaged, or the operator fuel demand (THL) is below a reference value ($REF_{THL}$) equal to a request for about 20% of the maximum engine fueling. For a typical heavy duty vehicle equipped with a diesel engine and an engine exhaust brake, a delay of about 300 milliseconds prior to the initiation of the shift from the currently engaged ratio and throttle dip will be sufficient to fully release the engine brake to ensure that master clutch disengagement-caused cab lurch is eliminated or minimized.

If the timer or counter has timed out and the engine fueling is less than a predetermined fueling reference value ($REF_{FUEL}$) equal to about 10%, the clutch 16 will be disengaged, to at least the touch point, and the logic will wait for gear neutral to be achieved and confirmed prior to initiating the appropriate synchronization procedure.

The control logic involves that period of time from initiating disengagement of the currently engaged gear ratio ($GR_c$) for a shift into a target gear ratio ($GR_T$) until gear neutral GN is achieved and confirmed and, (i) for downshifts, the master clutch is engaged allowing engine acceleration/deceleration to be immediately used to cause synchronous conditions for engaging the target gear ratio or, (ii) for an upshift, the master clutch is disengaged to at least the touch point (LP) allowing the input shaft brake to be used to cause synchronous conditions for engaging the target gear ratio.

To minimize the duration of shifting operations, once the CPU 42 has commanded a shift from the currently engaged ratio (GRc) into neutral (GN), immediately upon sensing and confirming a gear neutral condition, for downshifts, the CPU will cause the master clutch to be reengaged or remain engaged and will issue commands to the fuel control operator to initiate synchronizing operations and, for upshifts will cause the master clutch to be disengaged and immediately apply the input shaft brake to initiate synchronizing operations. Gear neutral GN is confirmed by position sensors in operator 34 and/or by monitoring shaft speed sensors 32 and 36 to determine that the input shaft speed divided by the output shaft speed (IS/OS) does not equal a known gear ratio (GR). If, upon initiation of a shift, gear neutral (GN) is not sensed, then the shift actuator 34 is commanded to preselect a disengagement of the currently engaged ratio and the fuel control 26 is commanded to gradually decrease the supply of fuel to engine 14. The fuel controller may, of course, be integral with an electronically controlled engine and/or fuel reduction may be accomplished by gradually decreasing the torque output of the engine. Various vehicle data bus protocols, such as SAE J1939, are available to accomplish this.

If gear neutral is not sensed, and the timer/counter has not timed out, and, if the engine brake was not applied prior to initiation of the shift operation, the clutch 16 will still be disengaged if fueling to the engine has been reduced below a reference value ($REF_{FUEL}$) equal to about 10% of maximum fueling and/or if the operator's positioning of the throttle pedal 24 indicates that operator fuel demand THL is below a reference value ($REF_{THL}$) equal to a request for about 20% of maximum engine fueling.

Figure 2A:
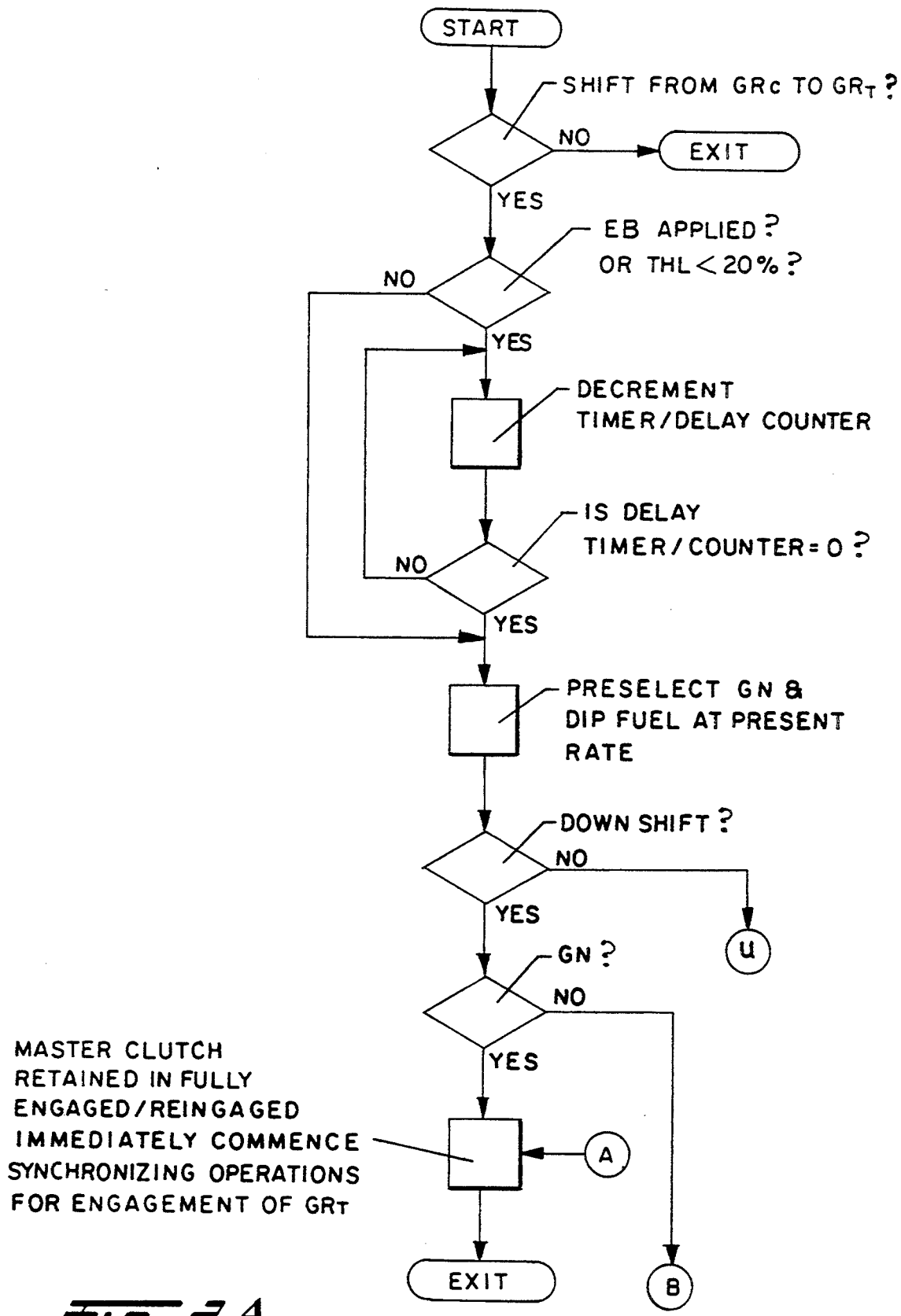
FIGS. 2A, 2B and 2C are a schematic representation, in flow chart format, of the control of the present invention.
Figure 2B:
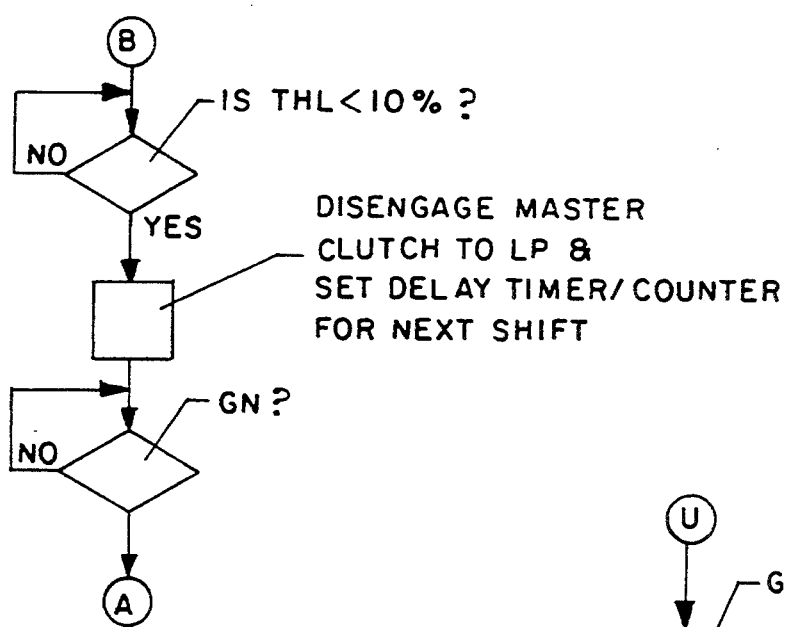
Figure 2C:
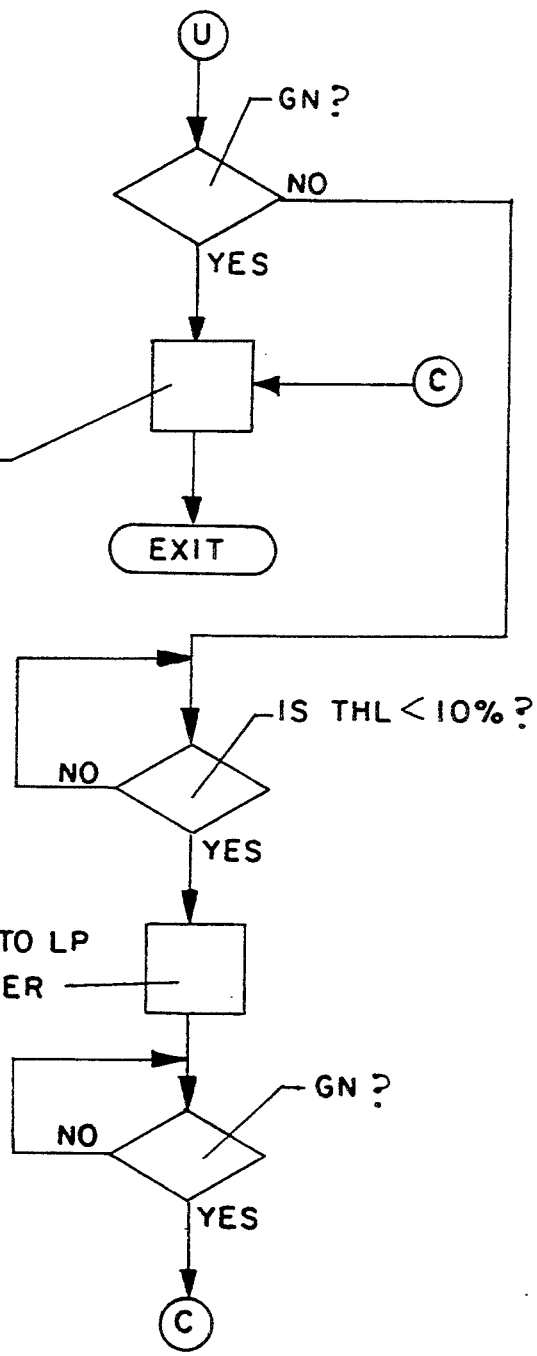

The control loop or subroutine illustrated in FIGS. 2A, 2B and 2C will be executed about once every ten milliseconds.

Accordingly, it may be seen that a clutch control method/system for an automated mechanical transmission system 10 is provided which will minimize shift times while minimizing or eliminating "cab lurch" events.

Although this invention has been described in its preferred form with a certain degree of particularity, it is understood that the present disclosure of the preferred embodiment has been made only by way of example, and that numerous changes in the detailed construction and combination and arrangement of the parts may be resorted to without departing from the spirit and the scope of the invention as hereinafter claimed.

I claim:

1. A method for controlling an automated mechanical transmission system (10) comprising a fuel controlled engine (14), a multiple-speed mechanical transmission (12), a selectively engaged and disengaged friction master clutch (16) drivingly interposed between said engine and said transmission, sensing means (22, 28, 32, 34, 36) for providing input signals indicative of monitored system parameters including engine speed (ES) and engagement condition (GR/GN) of the transmission, a control unit (42) for receiving said input signals and for processing same according to predetermined logic rules to issue command output signals to system actuators including a fuel control (26), a master clutch operator (30), and a transmission operator (34), said control unit issuing command output signals to said actuators to initiate a downshift from a currently engaged gear ratio ($GR_c$) into a target gear ratio ($GR_T$) by a downshift sequence including manipulation of the fueling of said engine to increase and decrease the speed of said engine while the master clutch is engaged and said transmission is in a not-engaged (GN) condition to cause substantially synchronous conditions for engagement of said target gear ratio, said method characterized by:
  after selection of a downshift from the currently engaged gear ratio into the target gear ratio;
  sensing the engaged or not-engaged condition of said transmission;
  Upon sensing a not-engaged condition of said transmission, causing said master clutch to assume and remain in the fully-engaged condition thereof; and
  after a predetermined period of time, causing said master clutch to disengage if a not-engaged condition of said transmission is not sensed.

2. The method of claim 1, wherein said system additionally comprises an input shaft brake (18) for selectively retarding the rotational speed of an input shaft to said transmission, said control unit issues command output signals to an input shaft brake operator (31) and said control unit issues command output signals to said actuators to initiate an upshift from a currently engaged gear ratio ($GR_c$) into a target gear ratio ($GR_T$) by an upshift sequence including manipulating the speed of the transmission input shaft while the master clutch is disengaged and the transmission is in the not-engaged condition, said method further characterized by;
  after selection of an upshift from the currently engaged gear ratio to the target gear ratio;
  sensing the engaged or not-engaged condition of said transmission;
  after said predetermined period of time, causing said master clutch to disengage if a not-engaged condition of said transmission is not sensed; and
  immediately upon sensing a not-engaged condition of said transmission causing said master clutch to disengage and remain in the disengaged condition thereof.

3. The method of claims 1 or 2 additionally comprising, after selection of both an upshift or a downshift from the currently engaged ratio into a target gear ratio, if a not-engaged transmission condition is not sensed, causing said transmission operator to urge said transmission into the not-engaged condition thereof and causing said fuel controller to decrease the fueling of said engine.

4. The method of claim 3 further comprising, after selection of both an upshift or a downshift, causing said master clutch to be disengaged if prior to the expiration of said period of time a not-engaged condition of said transmission is not sensed and if fueling of said engine is less than a predetermined fueling reference value ($REF_{FUEL}$).

5. The method of claim 4 wherein said fueling reference value ($REF_{FUEL}$) is equal to about 10% of the maximum fueling of said engine.

6. The method of claim 3 wherein said input signals include an input signal (THL) indicative of the operator's request for fueling of the engine and said method further comprises, after selection of both an upshift or a downshift, causing said master clutch to become disengaged if prior to the expiration of said predetermined time a not-engaged condition of said transmission is not sensed and the operator's request for fueling of the engine is less than a reference fuel request value ($REF_{THL}$).

7. The method of claim 6 wherein said reference fuel request value ($REF_{THL}$) is about 20% of maximum fueling of said engine.

8. The method of claim 3 wherein said system additionally comprises an engine brake (17) and said method additionally comprises, after selection of both an upshift or a downshift, causing said master clutch to become disengaged if prior to the expiration of said predetermined period of time a not-engaged condition of said transmission is not sensed, fueling to the engine is less than a engine fueling reference value and the engine brake was not applied at initiation of a shift from said currently engaged ratio into said target gear ratio.

9. The method of claim 8 wherein said reference value is about 10% of maximum engine fueling.

10. The method of claims 1 or 2 wherein said system includes means for sensing the point of incipient engagement of said clutch (LP) and said clutch is only disengaged to about the point of incipient engagement thereof, 11. The method of claim 1 additionally characterized by, after selection of a downshift, immediately upon sensing non-engagement of said transmission and engagement of said master clutch, causing said fuel control to modulate the speed of said engine to cause synchronous conditions for engagement of said target gear ratio.

12. The method of claim 2 additionally characterized by, after selection of a downshift, immediately upon sensing non-engagement of said transmission and engagement of said master clutch, causing said fuel control to modulate the speed of said engine to cause synchronous conditions for engagement of said target gear ratio.

13. The method of claim 12 additionally characterized by, after selection of an upshift, immediately upon sensing non-engagement of said transmission and disengagement of said master clutch, causing said input shaft brake to be applied to cause synchronous conditions for engagement of said target gear ratio.

14. A method for controlling an automated mechanical transmission system (10) comprising a fuel controlled engine (14), a multiple-speed mechanical transmission (12), a selectively engaged and disengaged friction master clutch (16) drivingly interposed between said engine and said transmission, sensing means (22, 28, 32, 34, 36) for providing input signals indicative of monitored system parameters including engine speed (ES) and engagement condition (GR/GN) of the transmission, a control unit (42) for receiving said input signals and for processing same according to predetermined logic rules to issue command output signals to system actuators including a fuel control (26), a master clutch operator (30), and a transmission operator (34), said control unit issuing command output signals to said actuators to initiate an upshift from a currently engaged gear ratio ($GR_c$) into a target gear ratio ($GR_T$) by a sequence including manipulating the speed of the transmission input shaft while the master clutch is disengaged and the transmission is in the not-engaged condition, said method characterized by;
  after selection of an upshift from the currently engaged gear ratio to the target gear ratio;
  sensing the engaged or not-engaged condition of said transmission;
  after said predetermined period of time, causing said master clutch to disengage if a not-engaged condition of said transmission is not sensed; and
  immediately upon sensing a not-engaged condition of said transmission causing said master clutch to disengage and remain in the disengaged condition thereof.

15. The method of claim 14 additionally comprising, after selection of an upshift from the currently engaged ratio into a target gear ratio, if a not-engaged transmission condition is not sensed, causing said transmission operator to urge said transmission into the not-engaged condition thereof and causing said fuel controller to decrease the fueling of said engine.

16. The method of claim 15 further comprising, after selection of an upshift, causing said master clutch to be disengaged if prior to the expiration of said period of time a not-engaged condition of said transmission is not sensed and if fueling of said engine is less than a predetermined fueling reference value ($REF_{FUEL}$).

17. The method of claim 16 wherein said fueling reference value ($REF_{FUEL}$) is equal to about 10% of the maximum fueling of said engine.

18. The method of claim 14 additionally characterized by, after selection of an upshift, immediately upon sensing non-engagement of said transmission and disengagement of said master clutch, causing said input shaft brake to be applied to cause synchronous conditions for engagement of said target gear ratio.

19. A method for controlling an automated mechanical transmission system (10) comprising a fuel controlled engine (14), a multiple-speed mechanical transmission (12), a selectively engaged and disengaged friction master clutch (16) drivingly interposed said engine and said transmission, sensing means (22, 28, 32, 34, 36) for providing the input signals indicative of monitor system parameters including engine speed (ES) and engagement condition (GR/GN) of the transmission, a control unit (42) for receiving said input signals and for processing same according to predetermined logic rules to issue command output signals to system actuators including a fuel control (26), a master clutch operator (30) and a transmission operator (34), said control unit issuing command output signals to said actuators to complete a shift from a currently engaged gear ratio ($GR_c$) into a target gear ratio ($GR_T$) by a sequence including manipulation of the speed of the input shaft of said transmission while said transmission is in a not engaged (GN) condition to cause substantially synchronous conditions for engagement of said target gear ratio, said method characterized by:

monitoring the engaged and not-engaged condition of said transmission; and causing said master clutch to be disengaged if a not-engaged condition of said transmission is not sensed within a predetermined period of time.

20. The method of claim 19 additionally characterized by biasing said transmission operator to cause said transmission to assume the not-engaged condition thereof and causing said fuel control to gradually decrease the supply of fuel to said engine upon initiation of a shift from said currently engaged ratio to said target gear ratio and causing said master clutch to be disengaged if, prior to the expiration of said predetermined period of time, said transmission not-engaged condition is not sensed and the supply of fuel supplied to said engine is less than a predetermined fuel supply reference value ($REF_{FUEL}$).

21. The method of claim 20 wherein said fuel reference value is about 10% of maximum engine fueling.

22. The method of claim 20 wherein said period of time is about 250 milliseconds.

23. A control system for controlling an automated mechanical transmission system (10) comprising a fuel controlled engine (14), a multiple-speed mechanical transmission (12), a selectively engaged and disengaged friction master clutch (16) drivingly interposed between said engine and said transmission, sensing means (22, 28, 32, 34, 36) for providing input signals indicative of monitored system parameters including engine speed (ES) and engagement condition (GR/GN) of the transmission, a control unit (42) for receiving said input signals and for processing same according to predetermined logic rules to issue command output signals to system actuators including a fuel control (26), a master clutch operator (30), and a transmission operator (34), said control unit issuing command output signals to said actuators to initiate a downshift from a currently engaged gear ratio ($GR_c$) into a target gear ratio ($GR_T$) by a downshift sequence including manipulation of the fueling of said engine to increase and decrease the speed of said engine while the master clutch is engaged and said transmission is in a not-engaged (GN) condition to cause substantially synchronous conditions for engagement of said target gear ratio, said control system characterized by:

means, effective after selection of a downshift from the currently engaged gear ratio into the target gear ratio;

for sensing the engaged or not-engaged condition of said transmission;

upon sensing a not-engaged condition of said transmission, for causing said master clutch to assume and remain in the fully-engaged condition thereof; and after a predetermined period of time, for causing said master clutch to disengage if a not-engaged condition of said transmission is not sensed.

24. The control system of claim 23 wherein said transmission system additionally comprises an input shaft brake (18) for selectively retarding the rotational speed of an input shaft to said transmission, said control unit issues command output signals to an input shaft brake operator (31) and said control unit issues command output signals to said actuators to initiate an upshift from a currently engaged gear ratio ($GR_c$) into a target gear ratio ($GR_T$) by an upshift sequence including manipulating the speed of the transmission input shaft while the master clutch is disengaged and the transmission is in the not-engaged condition, said control system further characterized by;

means, effective after selection of an upshift from the currently engaged gear ratio into the target gear ratio;

for sensing the engaged or not-engaged condition of said transmission;

after said predetermined period of time, causing said master clutch to disengage if a not-engaged condition of said transmission is not sensed; and immediately upon sensing a not-engaged condition of said transmission, for causing said master clutch to disengage and remain in the disengaged condition thereof.

25. The control system of claims 23 or 24 additionally characterized by means, effective after selection of both an upshift or a downshift from the currently engaged ratio into a target gear ratio, if a not engaged transmission condition is not sensed, for causing said transmission operator to urge said transmission into the not-engaged condition thereof and for causing said fuel controller to decrease the fueling of said engine.

26. The control system of claim 25 further characterized by means, effective after selection of both an upshift or a downshift, for causing said master clutch to be disengaged if prior to the expiration of said period of time a not-engaged condition of said transmission is not sensed and if fueling of said engine is less than a predetermined fueling reference value ($REF_{FUEL}$).

27. The control system of claim 26 wherein said fueling reference value ($REF_{FUEL}$) is equal to about 10% of the maximum fueling of said engine.

28. The control system of claim 26 wherein said input signals include an input signal (THL) indicative of the operator's request for fueling of the engine and said control system is further characterized by means, effective after selection of both an upshift or a downshift, for causing said master clutch to become disengaged if prior to the expiration of said predetermined time a not-engaged condition of said transmission is not sensed and the operator's request for fueling of the engine is less than a reference fuel request value ($REF_{THL}$).

29. The control system of claim 28 wherein said reference fuel request value ($REF_{THL}$) is about 20% of maximum fueling of said engine.

30. The control system of claim 28 wherein said transmission system additionally comprises an engine brake (17) and said control system is additionally characterized by means effective, after selection of both an upshift or a downshift, for causing said master clutch to become disengaged if prior to the expiration of said predetermined period of time a not-engaged condition of said transmission is not sensed, fueling to the engine is less than a engine fueling reference value and the engine brake was not applied at initiation of a shift from said currently engaged ratio into said target gear ratio.

31. The control system of claim 30 wherein said reference value is about 10% of maximum engine fueling.

32. The control system of claims 23 or 24 wherein said transmission system includes means for sensing the point of incipient engagement of said clutch (LP) and said clutch is only disengaged to about the point of incipient engagement thereof.

33. A control system for controlling an automated mechanical transmission system (10) comprising a fuel controlled engine (14), a multiple-speed mechanical transmission (12), a selectively engaged and disengaged friction master clutch (16) drivingly interposed said engine and said transmission, sensing means (22, 28, 32, 34, 36) for providing the input signals indicative of monitor system parameters including engine speed (ES) and engagement condition (GR/GN) of the transmission, a control unit (42) for receiving said input signals and for processing same according to predetermined logic rules to issue command output signals to system actuators including a fuel control (26), a master clutch operator (30) and a transmission operator (34), said control unit issuing command output signals to said actuators to complete a shift from a currently engaged gear ratio (GRc) into a target gear ratio ($GR_T$) by a sequence including manipulation of the speed of the input shaft of said transmission while said transmission is in a not engaged (GN) condition to cause substantially synchronous conditions for engagement of said target gear ratio, said control system characterized by:
  means for monitoring the engaged and not-engaged condition of said transmission; and
  means for causing said master clutch to be disengaged if a not-engaged condition of said transmission is not sensed within a predetermined period of time.

34. The control system of claim 33 additionally characterized by means for biasing said transmission operator to cause said transmission to assume the not-engaged condition thereof and for causing said fuel control to gradually decrease the supply of fuel to said engine upon initiation of a shift from said currently engaged ratio to said target gear ratio and for causing said master clutch to be disengaged if, prior to the expiration of said predetermined period of time, said transmission not-engaged condition is not sensed and the supply of fuel supplied to said engine is less than a predetermined fuel supply reference value ($REF_{FUEL}$).

35. The control system of claim 34 wherein said fuel reference value is about 10% of maximum engine fueling.

36. The control system of claim 34 wherein said period of time is about 250 milliseconds.

* * * * *